(12) United States Patent
Rema Shanmugam et al.

(10) Patent No.: US 8,467,839 B2
(45) Date of Patent: Jun. 18, 2013

(54) ELECTRONIC APPARATUS HAVING MOVABLE PARTS

(75) Inventors: Rajeev Rema Shanmugam, Chennai (IN); Mohanraj Manoharan, Chennai (IN); Mats Larsson, Beijing (CN); Gunnar Klinghult, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 103 days.

(21) Appl. No.: 12/766,127

(22) Filed: Apr. 23, 2010
(Under 37 CFR 1.47)

(65) Prior Publication Data
US 2011/0157033 A1 Jun. 30, 2011

Related U.S. Application Data

(63) Continuation-in-part of application No. 12/429,283, filed on Apr. 24, 2009, now Pat. No. 8,014,137.

(51) Int. Cl.
*G06F 1/16* (2006.01)

(52) U.S. Cl.
USPC .................. 455/575.4; 361/679.3; 361/679.56

(58) Field of Classification Search
USPC ....................................................... 361/679.3
See application file for complete search history.

(56) References Cited

U.S. PATENT DOCUMENTS

| | | | |
|---|---|---|---|
| 5,377,951 A | | 1/1995 | Johnson et al. |
| 6,009,338 A * | | 12/1999 | Iwata et al. ................ 455/575.4 |
| 6,993,128 B2 | | 1/2006 | Eromaki |
| 7,035,088 B2 | | 4/2006 | Pihlaja et al. |
| 7,353,053 B2 * | | 4/2008 | Prichard et al. ............ 455/575.4 |
| 7,414,830 B2 | | 8/2008 | Weinstein et al. |
| 8,014,137 B2 * | | 9/2011 | Rema Shanmugam et al. ........................ 361/679.02 |
| 8,199,487 B2 * | | 6/2012 | Clerc et al. ................ 361/679.55 |
| 8,200,299 B2 * | | 6/2012 | Lim ........................... 455/575.4 |

(Continued)

FOREIGN PATENT DOCUMENTS

| | | |
|---|---|---|
| EP | 1 638 298 A2 | 3/2006 |
| EP | 1 667 408 A1 | 6/2006 |

(Continued)

OTHER PUBLICATIONS

"Shape memory alloy", (Apr. 14, 2010), *Wikipedia*, retrieved on Apr. 16, 2010 from http://en.wikipedia.org/w/index.php?title=Shape_memory_alloy&oldid=356022206.

(Continued)

*Primary Examiner* — Anthony Q Edwards
(74) *Attorney, Agent, or Firm* — Renner, Otto, Boisselle & Sklar, LLP

(57) ABSTRACT

An electronic apparatus includes a display panel connected to a body and able to occupy a first and second position with respect to the body, and an input panel connected to the body and able to occupy a first and second position with respect to the body. When the display panel and the input panel both occupy their respective first position, the input panel hides part of the display panel. When the display panel occupies its first position and the input panel occupies its second position, the display panel hides at least part of the input panel. When the display panel occupies its second position, the input panel is movable from its first position to its second position and/or movable from its second position to its first position.

6 Claims, 14 Drawing Sheets

U.S. PATENT DOCUMENTS

| | | | |
|---|---|---|---|
| 8,233,948 B2* | 7/2012 | Francisco et al. | 455/575.4 |
| 2001/0031644 A1* | 10/2001 | Eromaki | 455/550 |
| 2002/0042853 A1* | 4/2002 | Santoh et al. | 710/8 |
| 2005/0233785 A1 | 10/2005 | Park et al. | |
| 2005/0245297 A1 | 11/2005 | Lee et al. | |
| 2005/0274786 A1 | 12/2005 | Hwang et al. | |
| 2006/0111161 A1* | 5/2006 | Cha et al. | 455/575.4 |
| 2006/0120029 A1* | 6/2006 | Ryu et al. | 361/680 |
| 2007/0037618 A1* | 2/2007 | Lee | 455/575.4 |
| 2008/0234014 A1 | 9/2008 | Kim et al. | |
| 2009/0027842 A1* | 1/2009 | Sandell et al. | 361/681 |
| 2009/0233660 A1* | 9/2009 | Demuynck | 455/575.4 |
| 2010/0093409 A1 | 4/2010 | Jokinen et al. | |

FOREIGN PATENT DOCUMENTS

| | | |
|---|---|---|
| JP | 2006086896 | 3/2006 |
| JP | 2008301244 | 12/2008 |
| JP | 2009060292 | 3/2009 |
| JP | 2012525040 | 10/2012 |
| WO | 2008/074358 A1 | 6/2008 |

OTHER PUBLICATIONS

Richard Lin, "Shape Memory Alloys and Their Applications", retrieved on Apr. 16, 2010 from http://www.stanford.edu/-richlin1/sma/sma.html.

"Subminiature High Sensitivity Photo Interrupter, ITR8307", Data sheet, pp. H-33 to H37, Everlight, Taipei, Taiwan.

"Ultra-Compact Surface-Mount Photointerrupter, TLP848", New Product Guide News, Apr. 2006, DQ, Toshiba.

NEC, Data Sheet, MRMS501A, "*Low voltage operation type Built-in IC ultra-small MR sensor*", No. MR-0501 A-E-02, Data of Issue: Apr. 2008.

STMicroelectronics, L297, "*Stepper Motor Controllers*", Dec. 2001.

SGS-Thomas Microelectronics, L297, L297D, "*Stepper Motor Controllers*", Aug. 1996.

RS Components, "*Stepper motor driver IC SAA 1027*",Data Pack J, Issued Mar. 1997 232-2699, RS stock No. 300-237.

U.S. Appl. No. 12/429,283, filed Apr. 24, 2009, entitled Electronic Apparatus Having Movable Parts.

International Search Report corresponding to PCT/EP2010/055441, mailed Aug. 2, 2010.

Written Opinion corresponding to PCT/EP2010/055441, mailed Aug. 2, 2010.

Japanese Office Action dated Mar. 5, 2013 for Japanese Application No. 2012-506522 (published as Japanese Publication No. 2012-525040).

\* cited by examiner

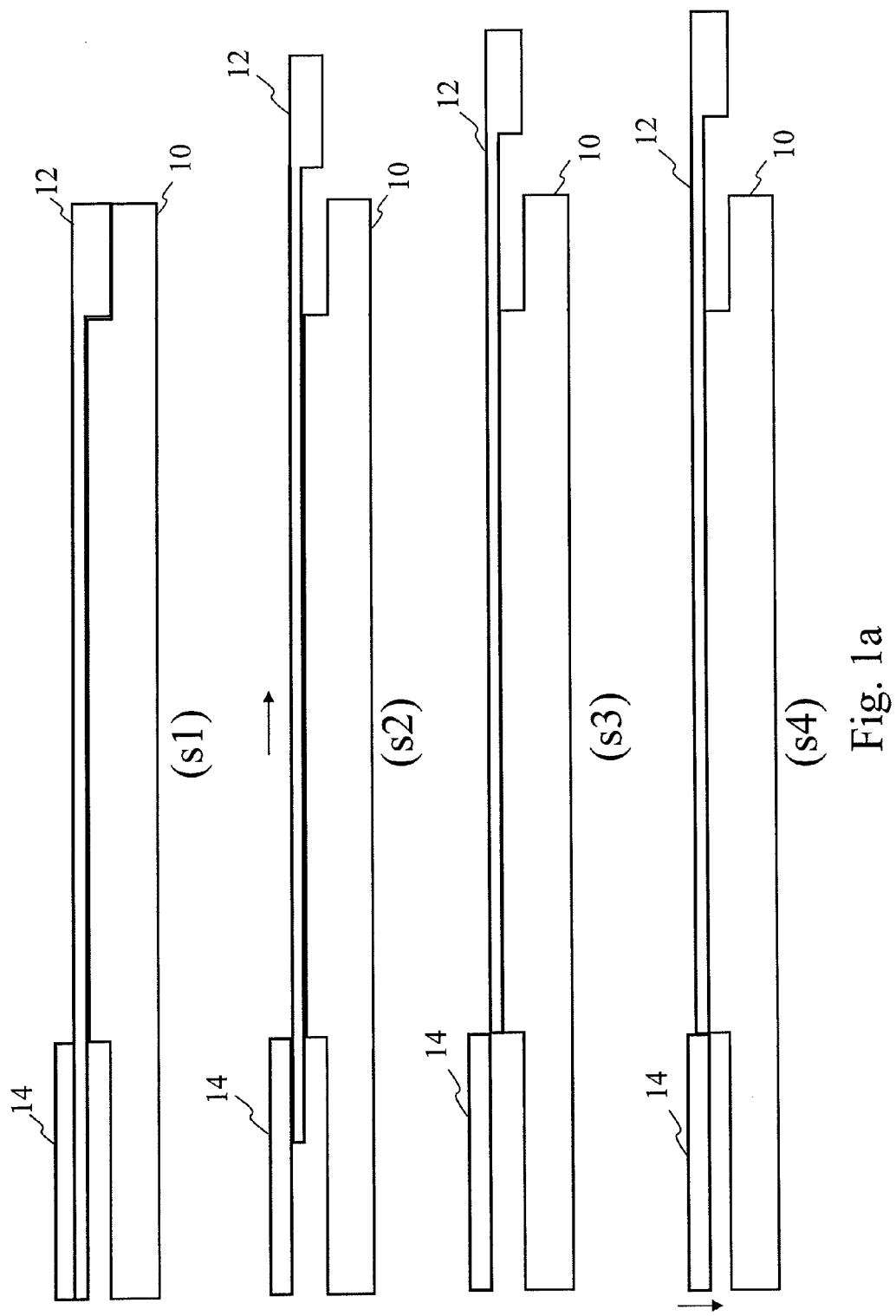

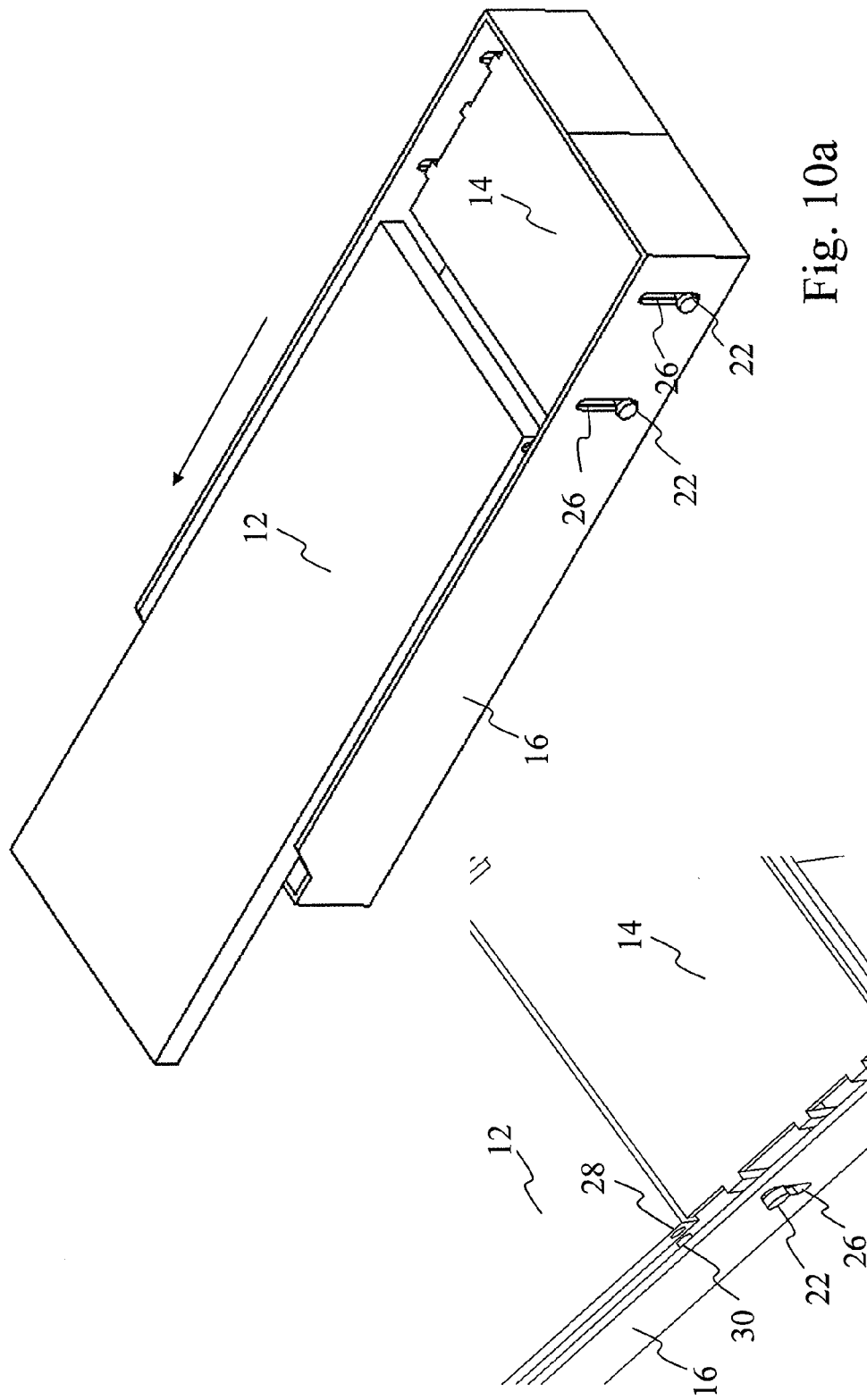

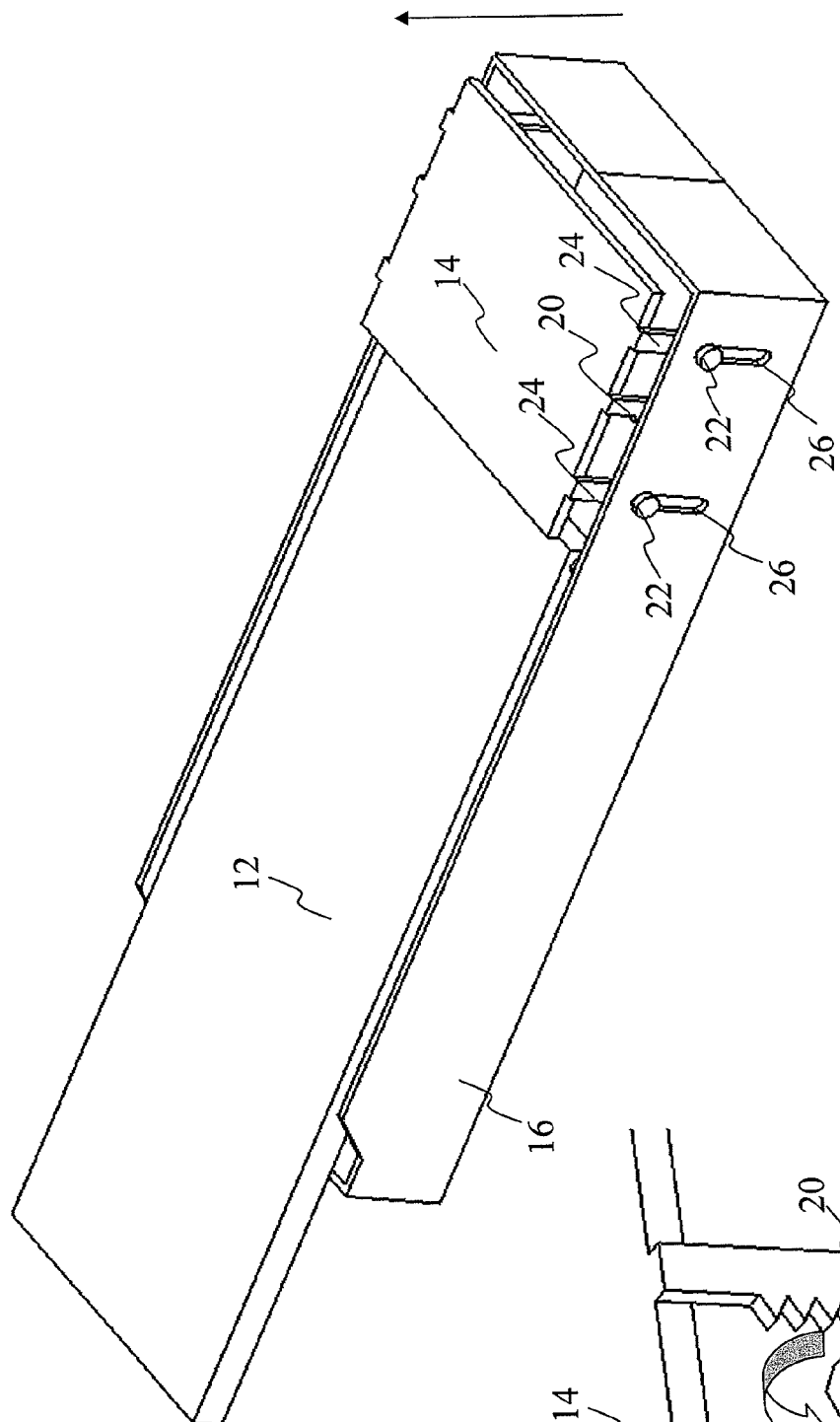
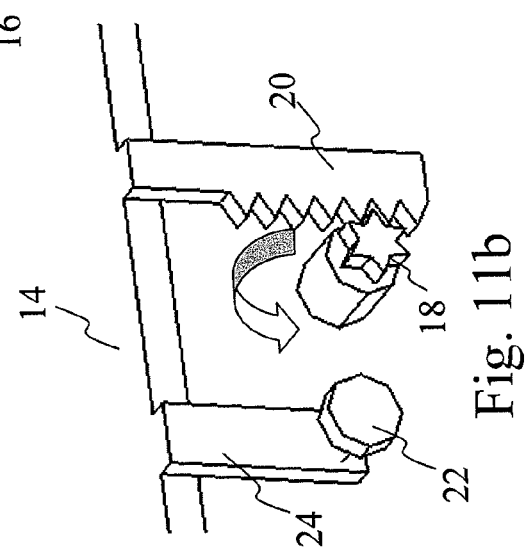
Fig. 11a
Fig. 11b

ELECTRONIC APPARATUS HAVING MOVABLE PARTS

This is a continuation-in-part of U.S. application Ser. No. 12/429,283, filed Apr. 24, 2009, the entire disclosure of which is incorporated by reference.

TECHNICAL FIELD

The present invention relates to an electronic apparatus having movable parts. The apparatus may for instance be a mobile phone including a display and a keypad.

BACKGROUND

Electronic apparatuses or terminals are used for various applications. For instance, portable wireless communications terminals are used for providing telecommunications between users and base stations, such as for transmitting voice or data communications.

Such electronic apparatuses may have different geometry. The particular geometry of an electronic apparatus is also referred to as its form factor. For instance, an electronic apparatus may have a bar form (also called "slab" or "candybar"), where the apparatus has an approximate rectangular parallelepiped form. Other form factors include the flip form factor (also called "clamshell") wherein two elements are connected through a hinge and can rotate along an axis in the plane of the two elements, the swivel form factor wherein two elements can pivot around an axis perpendicular to the two elements, and the slide form factor wherein two elements are able to slide with respect to each other.

European patent application EP1667408 relates to a portable terminal including a main housing and a sliding housing coupled thereto such that the sliding housing can slide to expose or hide a keypad module. The sliding movement of the sliding housing is converted into an up-and-down movement of the keypad module to overcome the difference in level among the upper surface of the sliding housing, the display device, and the keypad.

European patent application EP1638298 relates to a mobile terminal wherein, in an opening event of an upper housing, a key operation section automatically ascends and, in a closing event of the upper housing, the key operation section automatically descends to be stored in a lower housing.

It is desirable to improve the ease of use and convenient character of electronic apparatuses, notably as far as the ease of access to their functionalities and as far as their compactness is concerned.

SUMMARY

In order to meet or at least partially meet the above objectives, an electronic apparatus according to the invention is defined in the independent claim. Advantageous embodiments are defined in the dependent claims.

In one embodiment, the electronic apparatus includes a body, a display panel and an input panel. The display panel is movably connected to the body so as to be able to occupy at least a first position and a second position with respect to the body. The input panel is movably connected to the body so as to be able to occupy at least a first position and a second position with respect to the body. The apparatus is configured so that, when the display panel occupies its first position and the input panel occupies its first position, the input panel hides part of the display panel. The apparatus is further configured so that, when the display panel occupies its first position and the input panel occupies its second position, the display panel hides at least part of the input panel. The apparatus is yet further configured so that, when the display panel occupies its second position, the input panel is at least one of movable from its first position to its second position, and movable from its second position to its first position.

The apparatus is advantageous in that it provides compactness in two different states. In a first state, when the display panel occupies its first position and the input panel occupies its first position, the input panel hides part of the display panel. This means that the input panel can fully be used, the display panel can also be used, although part of the display panel is hidden by the input panel, and the size of the apparatus in that state is substantially the same as the size of the apparatus in a second state. In the second state, when the display panel occupies its first position and the input panel occupies its second position, the display panel hides at least part of the input panel. This means that the input panel cannot be used or cannot be fully used, while the display panel can be fully used, and the size of the apparatus in that second state is substantially the same as the size of the apparatus in the first state.

Thus, the apparatus may be stored for instance in a pocket, in one of its two states with no substantial size difference between the two states. If a user prefers one of the two states, the user can store, in his pocket, the apparatus in the preferred state without suffering the burden of an increased size due to the choice of the preferred state. This is because the two states involve substantially the same size.

In other words, whether a user prefers a full screen mode corresponding the second state (wherein the display panel occupies its first position, the input panel occupies its second position, and the display panel hides at least part of the input panel) or whether the user prefers having an access to the input panel (or key pad) in a "partial screen and keypad" mode corresponding the first state (wherein the display panel occupies its first position, the input panel occupies its first position, and the input panel hides part of the display panel), the size is substantially the same. The multimedia experience and ease of use is enhanced by offering a full screen mode, without removing the option to use a traditional keypad formed by the input panel and without increasing the size burden.

Other advantages will become apparent in view of the description below and the drawings.

In one embodiment, the electronic apparatus is at least one of a mobile phone, a game console, a personal digital assistant, a satellite navigation receiver, a digital camera, a laptop, a computer notebook, a media player, a messaging pager, a cordless phone, a video recorder, a mobile internet browser and a smart phone.

In one embodiment, the apparatus is further configured so that, when the display panel occupies its first position and the input panel occupies its first position, the input panel is not movable to its second position; and when the display panel occupies its first position and the input panel occupies its second position, the input panel is not movable to its first position.

In this embodiment, when the display panel occupies its first position, the movement of the input panel from any one of its first and second position to the other one is not possible. This is because, in this embodiment, in the first position of the display panel, part of the display panel occupies, or partially occupies, the movement space of the input panel, i.e. the space reserved for the input panel to move from any one of its first and second position to the other one. This feature enables compactness to be achieved.

In one embodiment, the apparatus is further configured so that the body defines a longitudinal axis, a lateral axis perpendicular to the longitudinal axis, and a vertical axis perpendicular to both the longitudinal and lateral axes; the display panel includes a display section or screen in the plane of the longitudinal and lateral axes; and the display panel is slidable along the longitudinal axis. This enables convenient hand-actuated movement of the display panel to cause it to move between its first and second positions.

In a sub-embodiment of this embodiment, the apparatus is further configured so that, when the display panel occupies its second position, the input panel is slidable along the vertical axis.

This enables convenient hiding, or at least partial hiding, of the input panel behind the display panel after the movement of the input panel to its second position, while also enabling convenient arrangement of the input panel in front of the display panel to hide part of the display panel after the movement of the input panel to its first position.

In one embodiment, the apparatus is further configured so that the movement of the display panel from its first position to its second position when the input panel occupies its second position causes the input panel to move to its first position.

This enables convenient movement, such as hand-actuated movement, of the display panel from its first position to its second position, while causing the input panel to move to its first position from its second position with no additional manipulations required from the user of the apparatus.

In one embodiment, the apparatus is further configured so that the movement of the display panel from its first position to its second position when the input panel occupies its first position causes the input panel to move to its second position.

This enables convenient movement, such as hand-actuated movement, of the display panel from its first position to its second position, while causing the input panel to move to its second position from its first position with no additional manipulations required from the user.

In one embodiment, the apparatus is configured so that, on the one hand, the movement of the display panel from its first position to its second position when the input panel occupies its first position causes the input panel to move to its second position and, on the other hand, the same movement of the display panel when the input panel occupies its second position causes the input panel to move to its first position. This enables convenient operation of the apparatus.

In one embodiment, the apparatus further includes a motor-driven mechanism to move the input panel from its first position to its second position, from its second position to its first position, or both from its first position to its second position and from its second position to its first position. In other words, the apparatus includes a motor-driven mechanism to move the input panel at least one of: from its first position to its second position, and from its second position to its first position. This provides a convenient and controllable actuation of the input panel.

In such an embodiment with a motor-driven mechanism, the apparatus may be such that the motor-driven mechanism includes a pinion-and-rack mechanism to convert a rotational motion produced by a motor into a linear motion of the input panel.

This provides a convenient implementation of a motor-driven mechanism to move the input panel at least from its first position to its second position and/or from its second position to its first position. This embodiment may be combined with resilient means to move the input panel from its first position to its second position or from its second position to its first position, whichever is not arranged to be actuated by the motor. Alternatively, the motor may be capable of rotating and producing a torque both clockwise and anti-clockwise to cause the input panel to move from its first position to its second position and from its second position to its first position depending on the torque's direction applied by the motor. A plurality of motors may also be provided to implement the motor-driven mechanism.

In one embodiment, the apparatus includes one or more controllable magnets to move or to assist in moving the input panel at least one of: from its first position to its second position, and from its second position to its first position.

In one embodiment, the apparatus includes one or more controllable shape memory alloy elements to move or to assist in moving the input panel at least one of: from its first position to its second position, and from its second position to its first position.

In one embodiment, the apparatus is such that the display panel is mechanically coupled to the input panel, in such a manner that, when the display panel is moved to its second position, the position of the input panel is first caused to be modified to an intermediate position between the first position and the second position of the input panel.

In one embodiment, the apparatus includes one or more sensors configured to detect whether the input panel occupies its first position or its second position; the apparatus being further configured so that, when the display panel is moved from its first position to its second position while the input panel is determined using the one or more sensors to occupy its second position, the input panel is caused to move to its first position, and, when the display panel is moved from its first position to its second position while the input panel is determined using the one or more sensors to occupy its first position, the input panel is caused to move to its second position.

In one embodiment, the apparatus is such that the display panel includes touch sensing capabilities to detect the presence or position of a finger, hand or other object on the display panel or in the vicinity thereof; wherein the apparatus is further configured so that when the display panel is moved from its first position to its second position while the input panel is determined to occupy its second position, the input panel is caused to move to its first position, and, when the display panel is moved from its first position to its second position while the input panel is determined to occupy its first position, the input panel is caused to move to its second position. In this embodiment, the same touch sensing capabilities which are used to detect the presence or position of a finger, hand or other object on the display panel or in the vicinity thereof are also used to determine whether the input panel occupies its first position or its second position.

BRIEF DESCRIPTION OF THE DRAWINGS

Embodiments of the present invention shall now be described, in conjunction with the appended figures, in which:

FIGS. 1a to 1d are schematic side views of an electronic apparatus in one embodiment of the invention, with successive states shown;

FIGS. 10a and 10b schematically illustrate the movement of the display panel of the apparatus illustrated on FIG. 2 from its first position to the second position;

FIGS. 11a and 11b schematically illustrate the input panel of the apparatus illustrated on FIG. 2 moving and reaching its first position.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

FIGS. 1a to 1d schematically illustrate successive states (s1) to (s13) of an electronic apparatus in one embodiment of the invention. The successive states are intended to take place sequentially.

In FIG. 1a, state (s1), a side view of the electronic apparatus is schematically shown. A display panel 12 is arranged on a body 10 of the electronic apparatus. An input panel 14 is arranged on top of the display panel 12, hiding a part of the front face of the display panel 12 for a user (not illustrated) looking from above the illustrated apparatus. The display panel 12 includes at least a display section. The display section may for instance be a liquid crystal display (LCD). The display section may also be a touchscreen. The input panel 14 includes at least an input section. The input section may for instance be a keypad or a touchpad. The body 10 or housing may carry a telecommunications receiving circuit, a telecommunications transmitting circuit, an antenna, a printed board assembly, a battery, etc.

State (s1) corresponds to the "partial screen and keypad" mode. The display panel 12 occupies its first position, the input panel 14 occupies its first position, and the display panel 12 is partially hidden by the input panel 14. The input panel 14 cannot move in that state towards its second position. The display panel 12 occupies the movement space of the input panel 14.

In state (s2), the display panel 12 is moving from its first position towards its second position as illustrated by rightward arrow. The input panel 14 still occupies its first position during this movement of the display panel 12.

In state (s3), the display panel 12 has reached its second position. The input panel 14 still occupies its first position, but the input panel 14 is ready to move, or to be moved, towards its second position.

In state (s4), the input panel 14 is moving downwards towards its second position, as illustrated by the downward arrow. During this movement of the input panel 14, the display panel 12 remains in its second position.

Figure 1B:
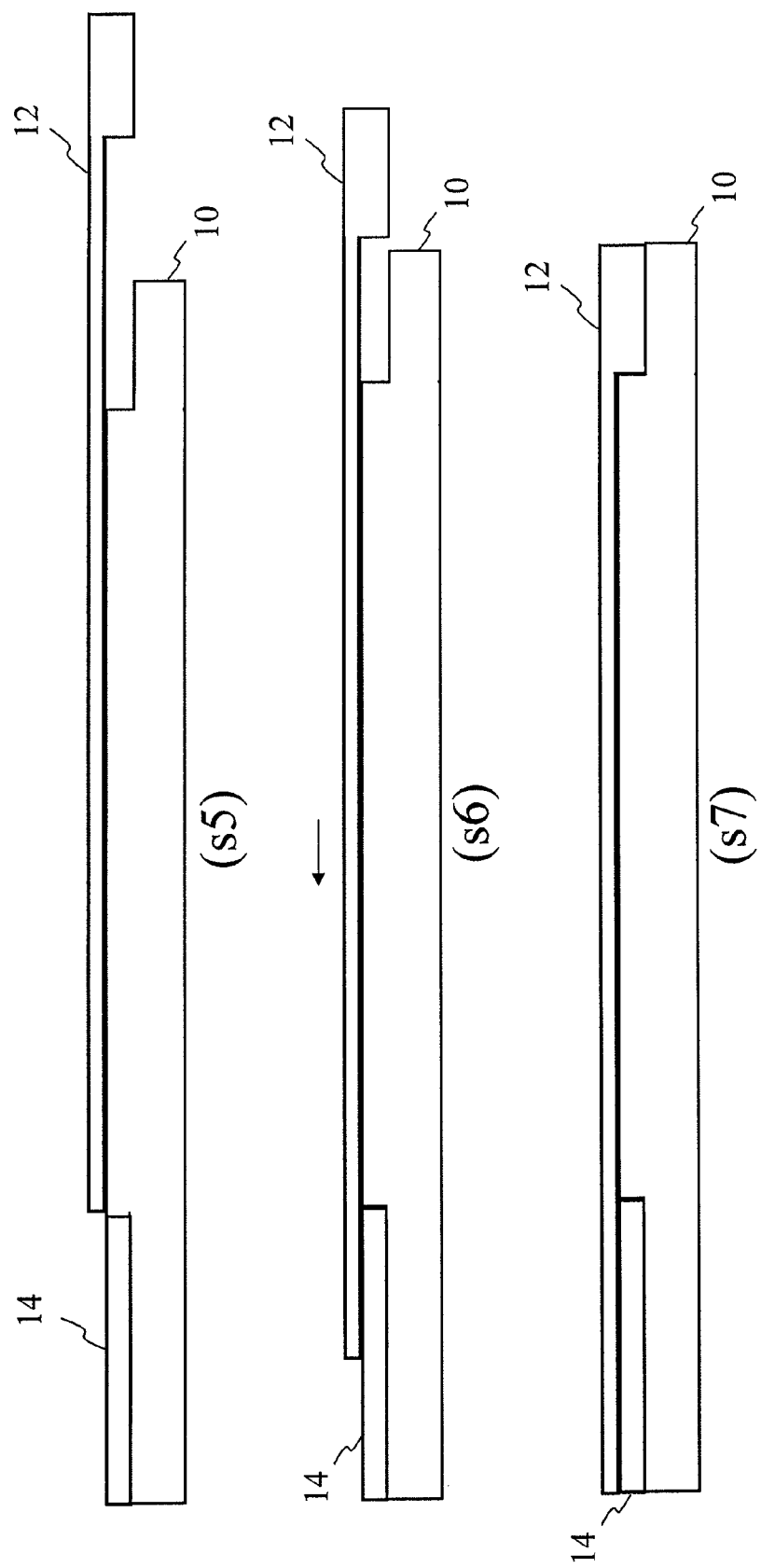

Now turning to FIG. 1b, in state (s5), the input panel 14 has reached its second position and the display panel 12 still occupies its second position. The display panel 12 is however ready to move back towards its first position.

In state (s6), the display panel 12 is moving towards its first position, as illustrated by the leftward arrow. The input panel 14 occupies, and stays at, its second position.

In state (s7), the display panel 12 has reached its first position. The display panel 12 thus hides, for a user looking at the apparatus from the above of FIG. 1b, the input panel 14, which occupies its second position. This state (s7) corresponds to the full-screen mode. The input panel 14 cannot move in that state towards its first position. The display panel 12 occupies the movement space of the input panel 14.

Although FIG. 1b, state (s7), shows an embodiment wherein, in the full-screen mode, the display panel 12 entirely hides the input panel 14 or more precisely the upper surface of the input panel 14, embodiments wherein the display panel 12 hides only a part of the input panel 14 are within the scope of the invention.

States (s1) to (s7) in FIGS. 1a and 1b schematically illustrate the transition from the "partial screen and keypad" mode to the "full screen" mode. The transition from the "full screen" mode to the "partial screen and keypad" mode will now be described with reference to states (s7) to (s13) illustrated in FIGS. 1c and 1d.

Figure 1C:
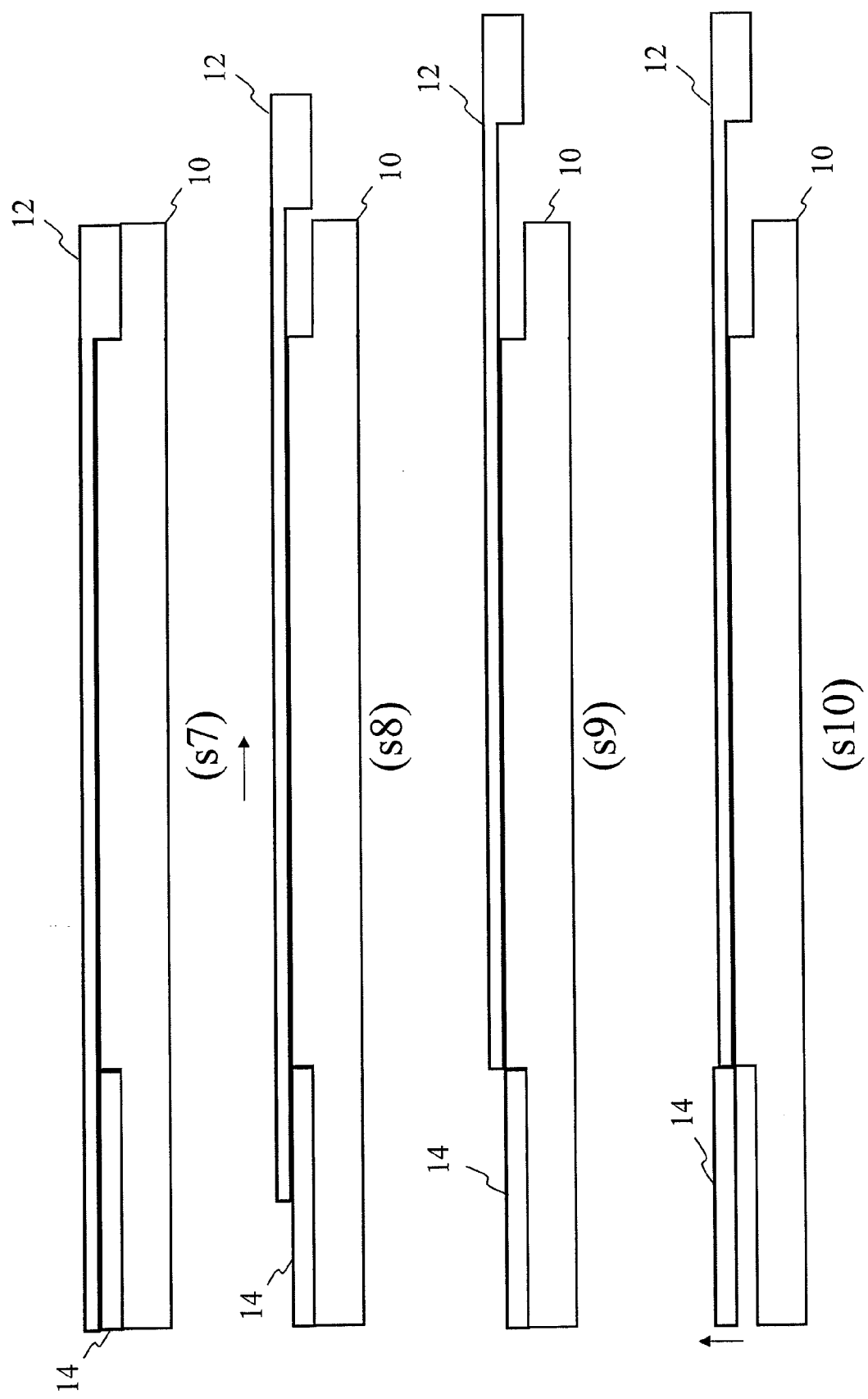

State (s7) in FIG. 1c corresponds to the same state described with reference to FIG. 1b, i.e. the full screen mode. In state (s8), the display panel 12 is moving from its first position towards its second position, as illustrated by the rightward arrow. The input panel 14 occupies, during this step, its second position.

In state (s9), the display panel 12 has reached its second position. The input panel 14, which still occupies its second position, is ready to move back towards its first position.

In state (s10), the input panel 14 is moving from its second position towards its first position, as illustrated by the upward arrow. During this step, the display panel 12 remains in its second position.

Figure 1D:
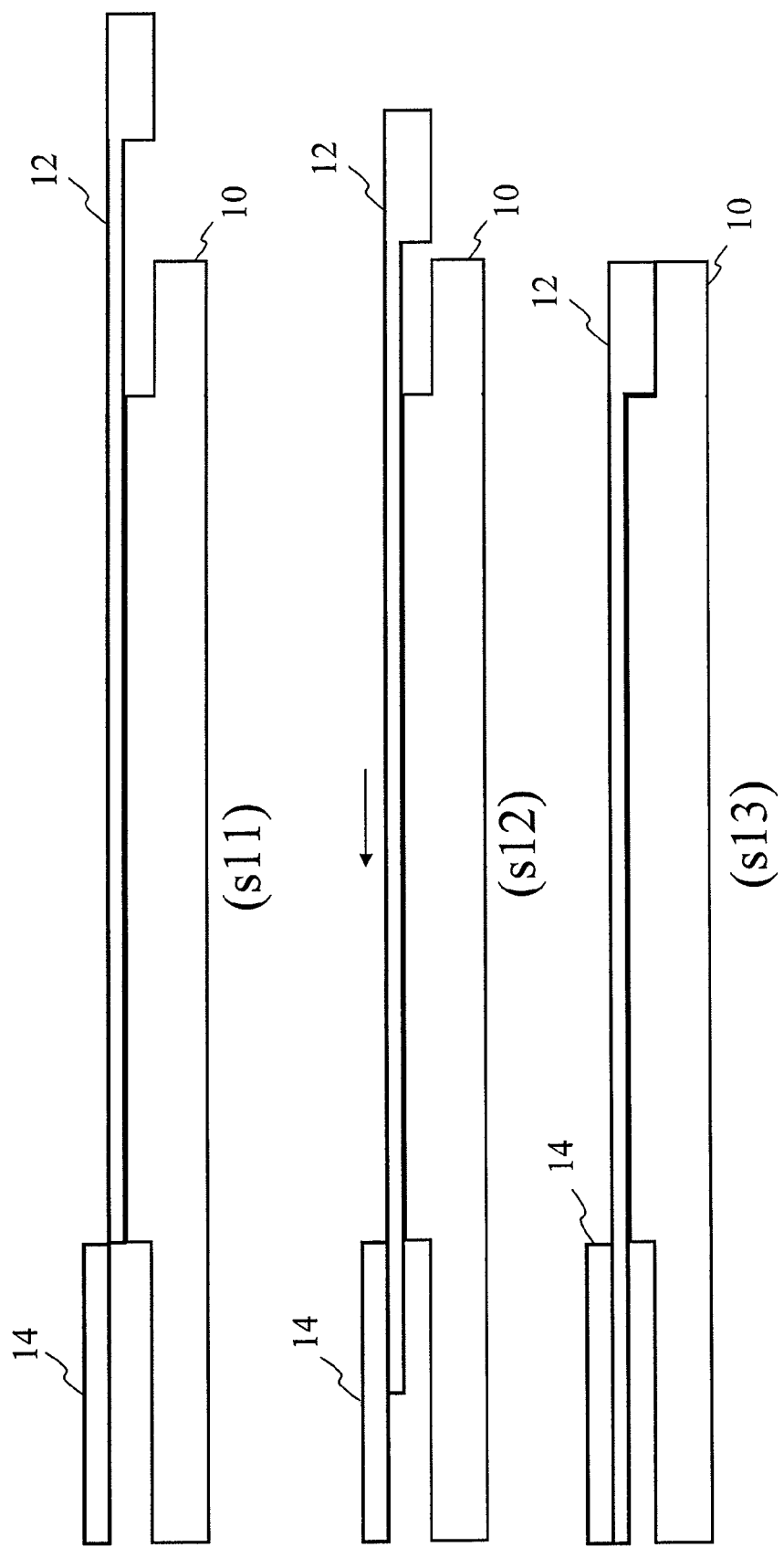

Now turning to FIG. 1d, in state (s11), the input panel 14 has reached its first position. The display panel 12 is still at its second position but is ready to move back towards its first position.

In state (s12), the display panel 12 is moving from its second position towards its first position, as shown by the leftward arrow. During this step, the input panel 14 stays at its first position.

Then, in state (s13), the display panel 12 has reached its first position and the input panel 14 occupies its first position. State (s13) corresponds to state (s1) illustrated in FIG. 1a, which is the "partial screen and keypad" mode.

In the embodiment illustrated in FIG. 1a to 1d, a display panel 12 is shown as having at its distal end (i.e. at its end on the right-hand side of the figures) a thickness which is larger than its thickness in its centre and at its proximal end (i.e. on the left-hand side of the figures). The body 10 is also shown as having a recess at the distal end of the apparatus. These characteristics are however optional. Namely, in one embodiment, the thickness of the display panel 12 is constant or substantially constant along its length and no recess is provided at the distal end (i.e. at the right-hand side of the figures) in the body 10.

Now, an embodiment wherein the input panel 14 is configured to be moved from its first position to its second position and/or from its second position to its first position using a motor-driven mechanism will be described with reference to FIGS. 2-12. In this embodiment, the movement of the display panel 12 may be hand-actuated or, alternatively, also actuated by a motor-driven mechanism.

Figure 2:
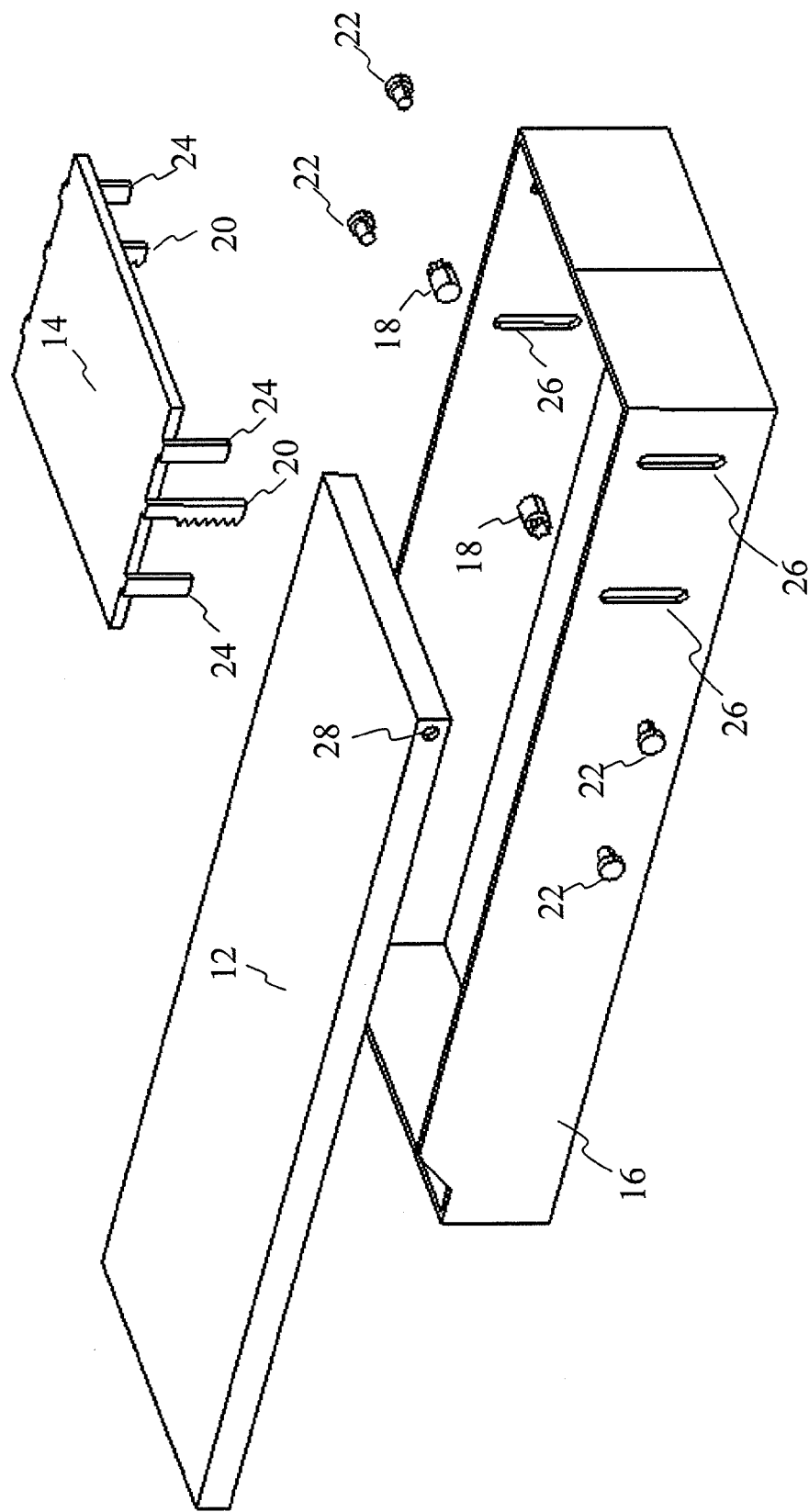
FIG. 2 is an exploded schematic view of some elements of an electronic apparatus in one embodiment of the invention.

FIG. 2 schematically illustrates an exploded view of some of the elements of an electronic apparatus in the above mentioned motor-driven embodiment. A base frame 16 is fixedly connected to the body 10 (not illustrated in FIG. 2). The display panel 12 is slidably movable with respect to the base frame 16. The input panel 14 (also called here keypad panel 14) is also movable with respect to the base frame 16, but in a direction perpendicular to the direction along which the display panel 12 is movable.

Figure 5A:
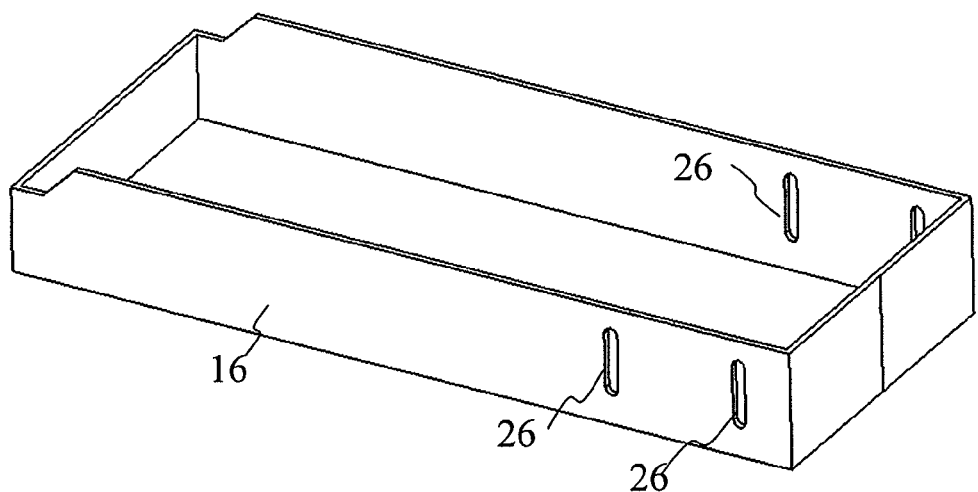
FIGS. 5a and 5b schematically illustrate a base frame formed within the body of the apparatus illustrated on FIG. 2.
Figure 5B:
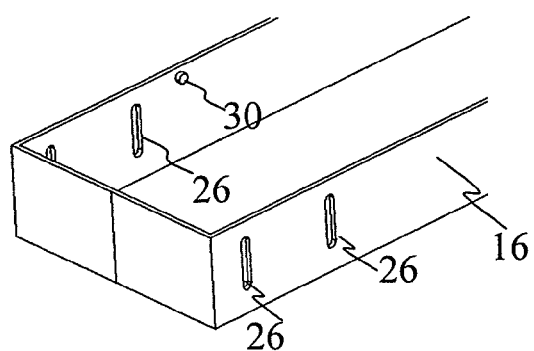

The display panel 12 and the base frame 16 comprise a sensing assembly including a sensor 30 provided on the inside surface of the base frame 16, as illustrated in FIG. 5b, and an element 28 provided on the lateral side of the display panel 12. The element 28 is detectable by the sensor 30, when the element 28 and the sensor 30 face each other. The element 28 may for instance be a magnet. When the sensor 30 detects the element 28, this indicates that the display panel 12 occupies its second position. The sensing assembly may be arranged differently or composed by any electronic or electromechanical elements as long as the second position of the display panel 12 can be detected by the sensing assembly.

A flat element 20 comprising teeth extends perpendicularly to the surface of the input panel 14. The flat element 20 is here referred to as rack 20. A circular gear 18, here referred to as pinion 18, engages the teeth of the rack 20. The pinion 18 is driven by a motor. The pinion 18 and the motor are fixedly connected to the base frame 16. The rotation of the pinion 18 is converted by the rack 20 into a translation of the input panel 14. The motor driving the pinion 18 is activated when the sensor 30 detects that the display panel 12 occupies its second position.

A control unit (not illustrated) may be provided to transmit the command from the sensor 30 to the motors. The control unit may be implemented in hardware, software, field-programmable gate array (FPGA), application-specific integrated circuit (ASICs), firmware or the like.

Two motors may be provided, one on each lateral side of the base frame 16. Alternatively, only one motor or more than two motors may be provided. The motor or the motors may be arranged in any manner suitable to move the input panel 14 downwards.

Four flat elements 24 are also extending perpendicularly to the input panel 14. At the end of each flat element 24, a guide pin 22 is provided. The guide pins 22 are movable within grooves 26 provided within the base frame 16. This allows the input panel 14 to move in a stable manner from its first position to its second position and back from the second position to the first position.

Figure 3:
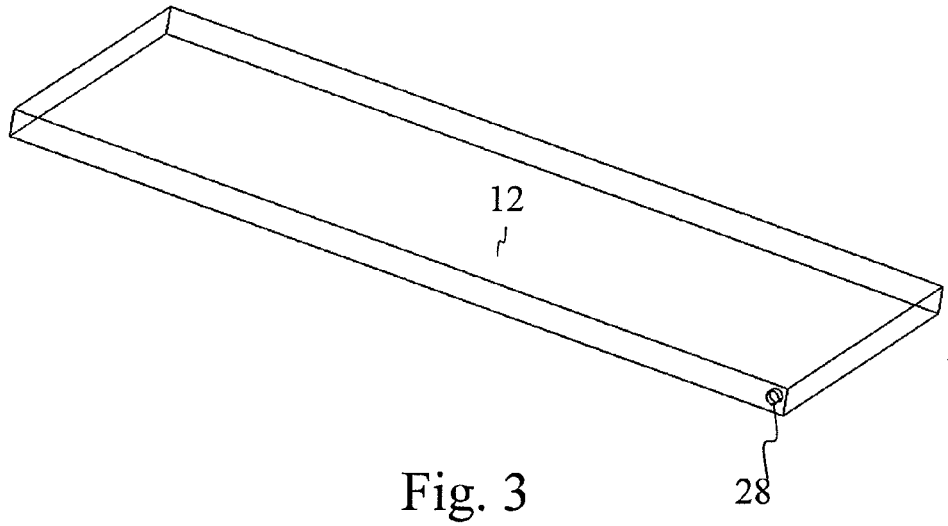
FIG. 3 schematically illustrates details of a display panel of the apparatus illustrated on FIG. 2.

FIG. 3 schematically illustrates the display panel 12 provided with the element 28 detectable by the sensor element 30 provided with the inside service of the base frame 16.

Figure 4A:
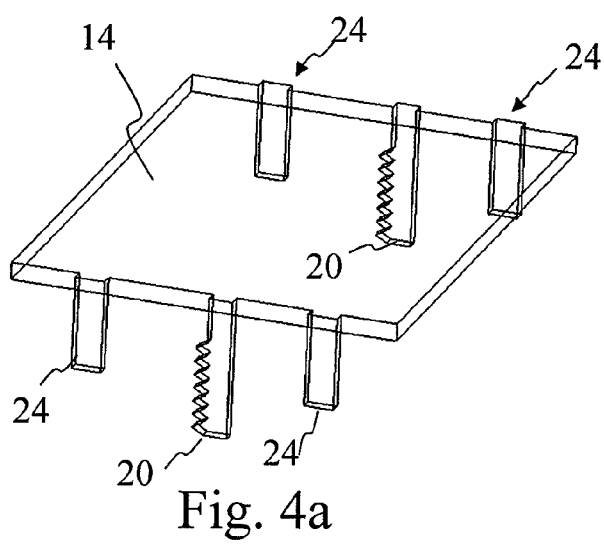
FIG. 4a schematically illustrates details of an input panel of the apparatus illustrated on FIG. 2.

FIG. 4a schematically illustrates the input panel 14. The two racks 20 and the four flat elements 24 are extending perpendicularly to the surface of input panel 14. At the end of each one of the four flat elements 24, guide pins 22 are provided (not illustrated in FIG. 4a).

Figure 4B:
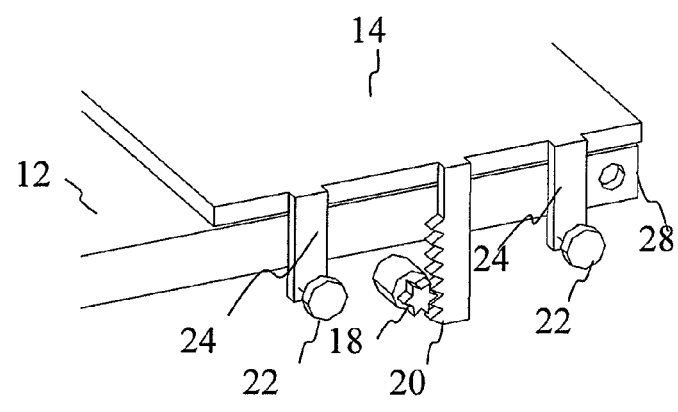
FIG. 4b schematically illustrates the input panel occupying its first position and the display panel occupying its first position in the apparatus illustrated on FIG. 2.

FIG. 4b schematically illustrates the input panel 14 occupying its first position and the display panel 12 occupying its first position. The display panel 12 is hidden under the input panel 14. It is also shown how the pinion 18 engages the teeth of the rack 20.

FIGS. 5a and 5b schematically illustrate the base frame 16 fixedly connected to the body 10 of the apparatus. The base frame 16 includes four grooves 26 for receiving the guide pins 22 of the input panel 14. As mentioned above, FIG. 5b also illustrates the sensor 30.

Figure 6A:
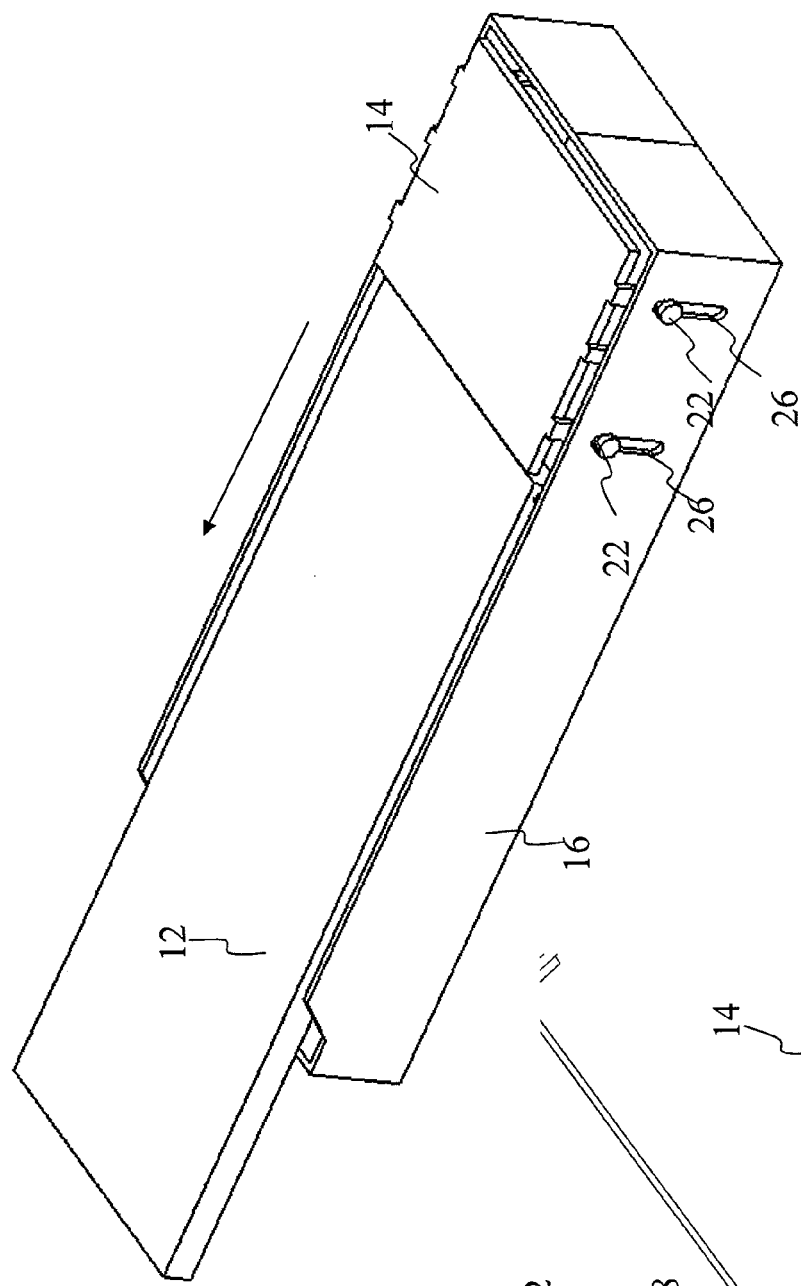
FIGS. 6a and 6b schematically illustrate the state of the apparatus illustrated on FIG. 2, wherein the display panel has reached its second position.
Figure 6B:
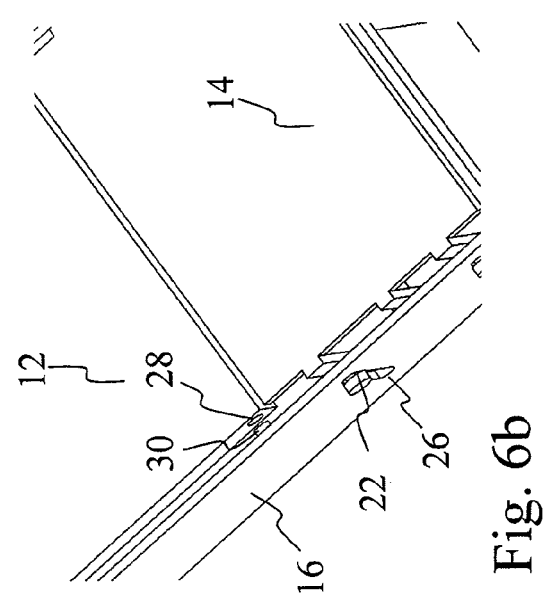

FIG. 6a schematically illustrates the display panel 12 having reached its second position (corresponding to state (s3) in FIG. 1a) after having moved from its first position (as shown by the arrow in FIG. 6a), while the input panel 14 still occupies its first position. At that point, the sensor 30 detects the element 28, as shown in FIG. 6b, and the rotating motors coupled to the pinions 18 are activated.

Figure 7A:
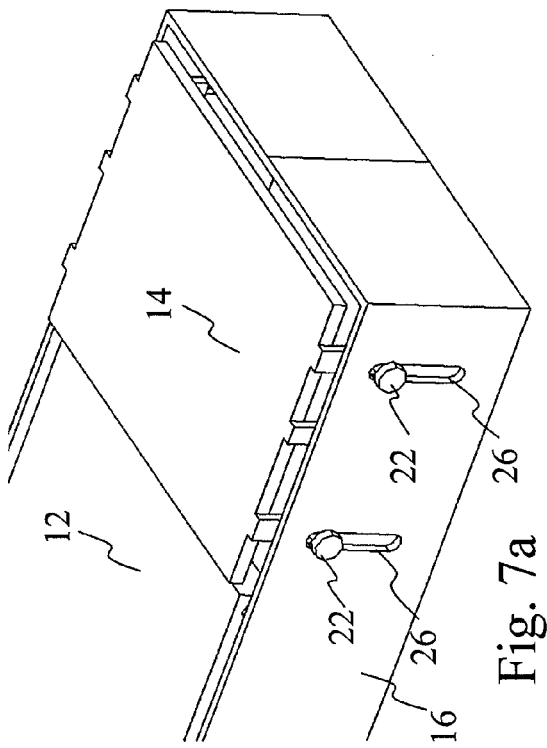
FIGS. 7a to 7c schematically illustrate views of the state of the structural elements of the apparatus illustrated on FIG. 2, when the input panel starts moving downwards.
Figure 7B:
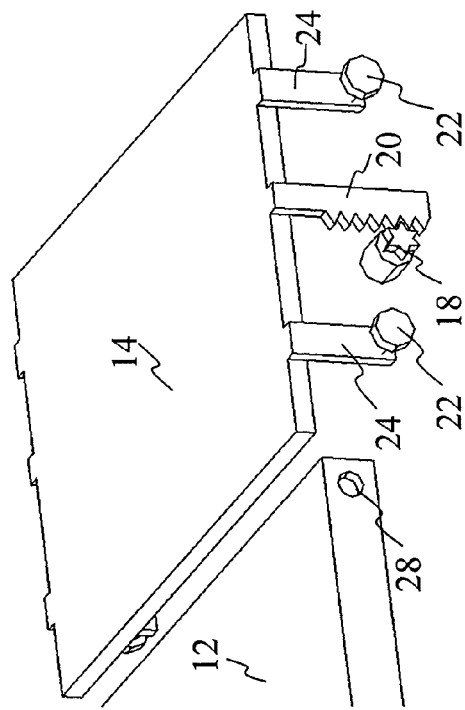
Figure 7C:
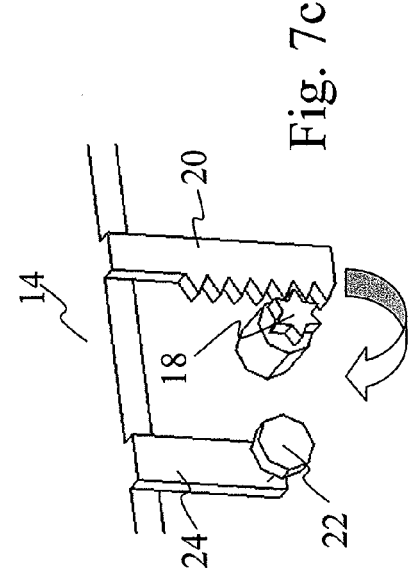

Views of the structural elements of the apparatus when the motors are activated are shown in FIGS. 7a, 7b and 7c. In particular, the arrow in FIG. 7c schematically illustrates that the motor on this particular side of the base frame 16 is activated to cause the pinion 18 to rotate clockwise in order to pull the rack 20 and the input panel 14 downwards.

Figure 8:
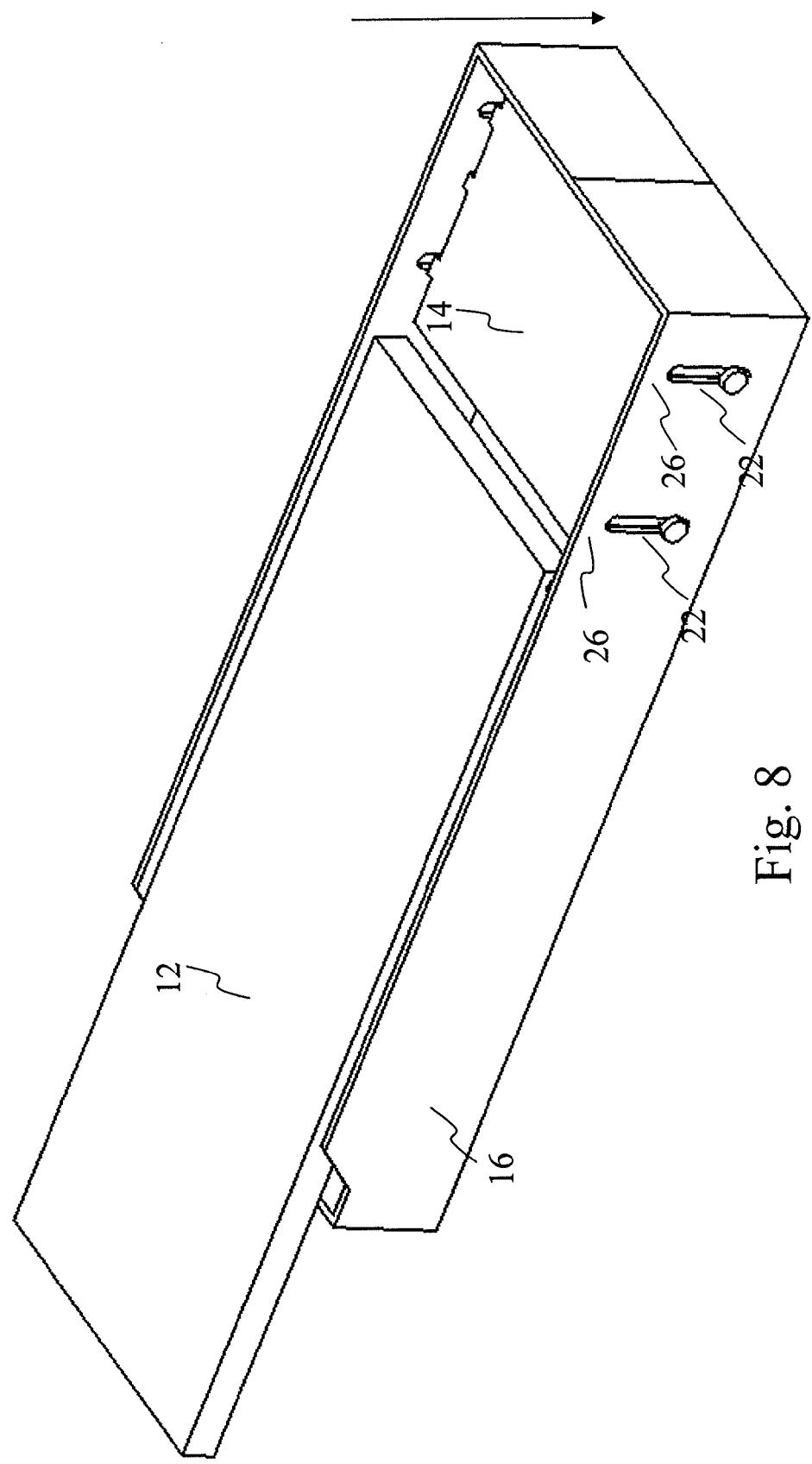
FIG. 8 schematically illustrates the state where the input panel of the apparatus illustrated on FIG. 2 has reached its second position.

FIG. 8 schematically illustrates the state where the input panel 14 has traveled from it first position to its second position (as illustrated by the downward arrow) and has reached its second position. This state corresponds to state (s5) in FIG. 1b. The display panel 12 has at that stage sufficient room to move back from its second position to its first position.

Figure 9:
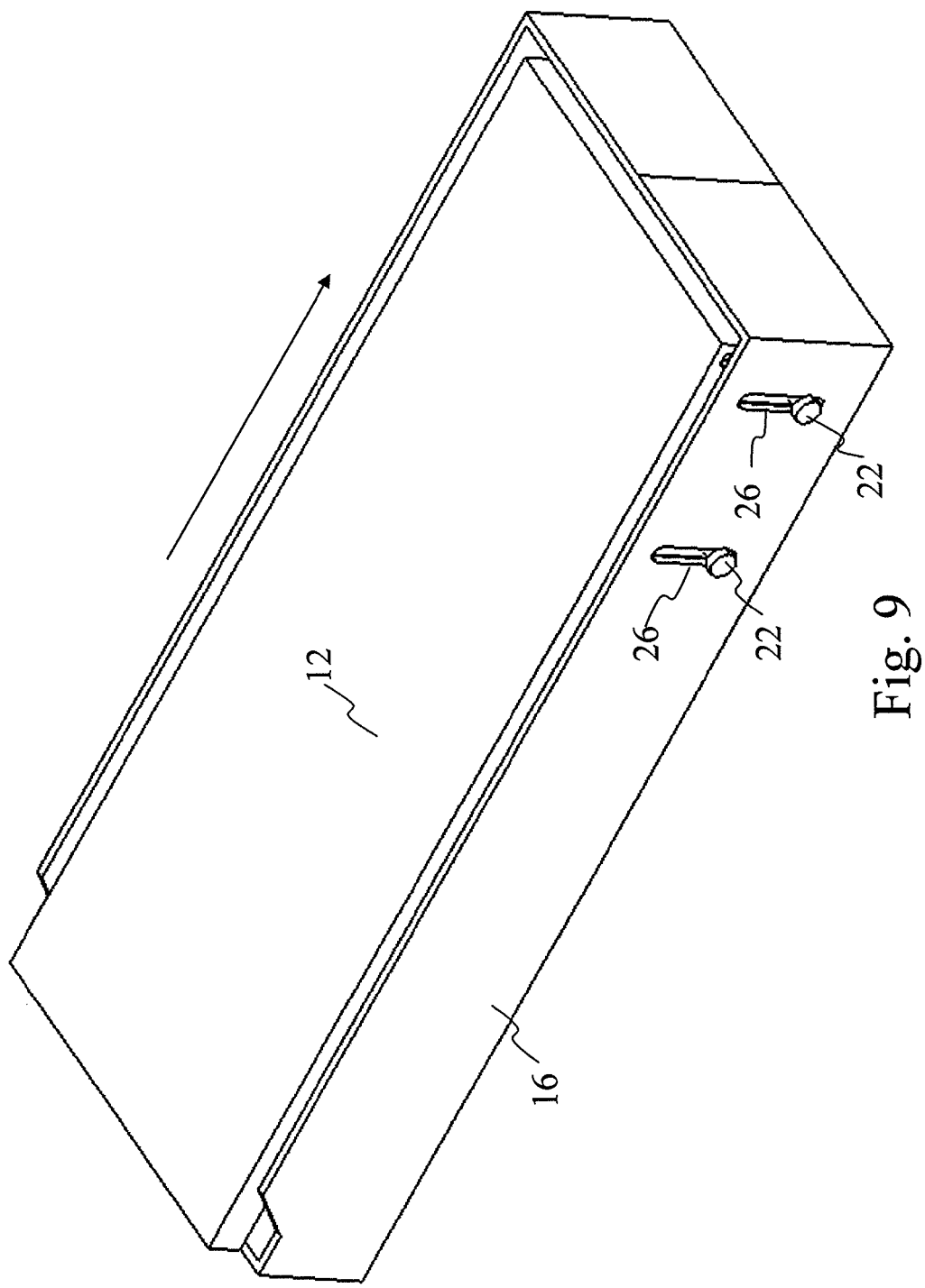
FIG. 9 schematically illustrates the state where the display panel of the apparatus illustrated on FIG. 2 has reached its first position above the input panel.

The state where the display panel 12 has moved from its second position to its first position and has reached its second position is schematically illustrated in FIG. 9. The arrow illustrates the movement of the display panel 12 from its second position to its first position. This state corresponds to state (s7) in FIG. 1b, namely the full screen mode. At that stage, the input panel 14 is hidden under the display panel 12.

FIG. 10a schematically illustrates the sliding out movement of the display panel 12 from its first position to the second position (as illustrated by the arrow on FIG. 10a). In particular, the display panel 12 has reached its second position in the state illustrated in FIG. 10a, which corresponds to state (s9) in FIG. 1c. At that point, as illustrated in FIG. 10b, the sensor element 30 detects the element 28 and the motors are activated to drive the input panel 14 upwards.

The arrow on FIG. 11b illustrates the anticlockwise rotation of the pinion 18 driven by the motor and driving the rack 20 and input panel 14 upwards. At the end of this movement, the input panel 14 reaches its first position, as schematically illustrated in FIG. 11a. This state corresponds to state (s11) in FIG. 1d.

Figure 12:
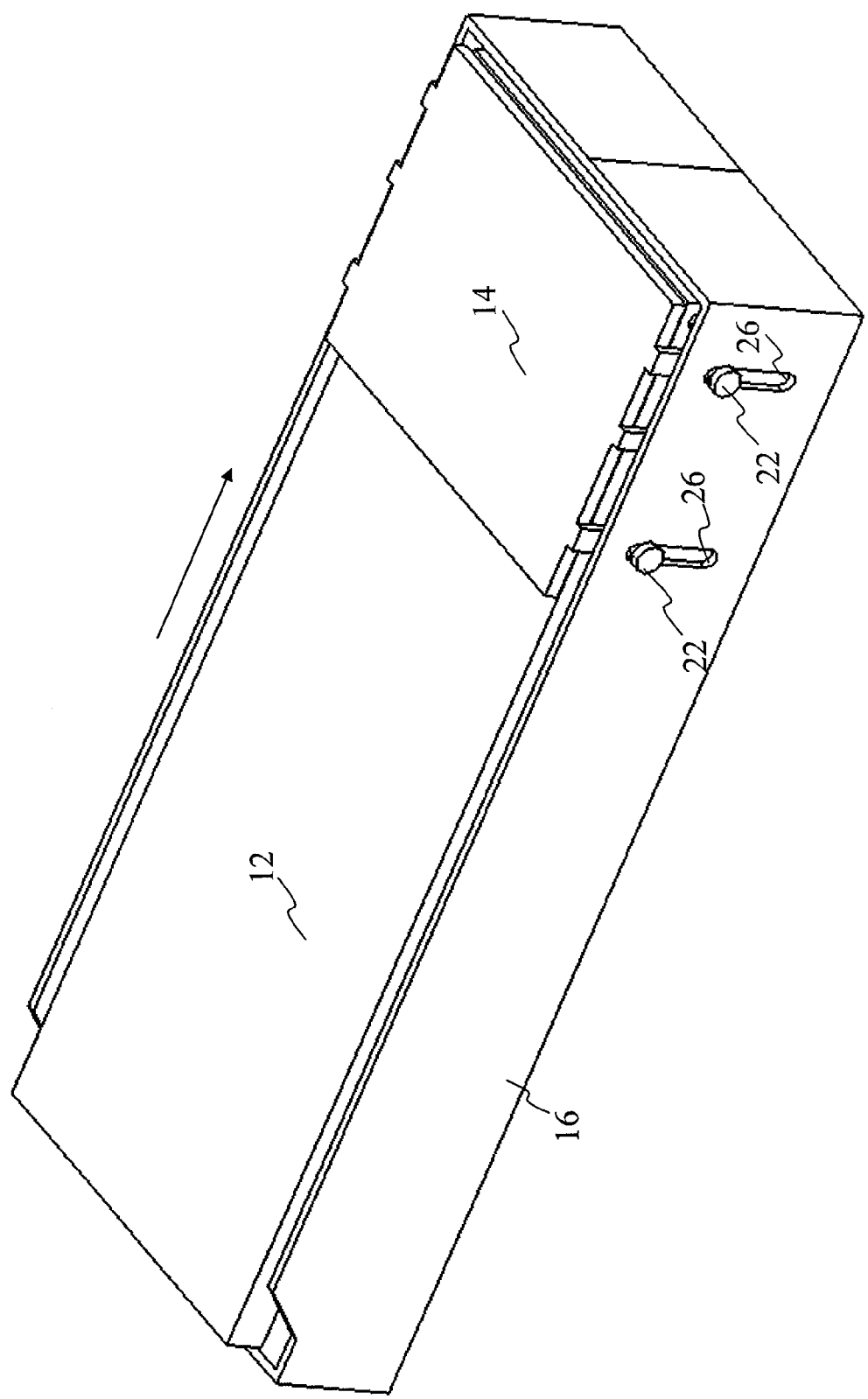
FIG. 12 schematically illustrates the display panel of the apparatus illustrated on FIG. 2 having moved back to its first position.

Finally, FIG. 12 schematically illustrates the display panel 12 having moved back to its first position and being then partially under the input panel 14. The display panel 12 occupies the movement space of the input panel 14. This state corresponds to state (s13) in FIG. 1d.

In one embodiment, which may be combined with any one of the above-described embodiments, the display panel 12 may additionally include touch keys (not illustrated) around the display section, which may be accessible in both modes (in "full screen" mode and "keypad and partial screen" mode) or in full screen mode only.

In one embodiment, which may be combined with any one of the above-described embodiments, the state wherein the display panel 12 occupies its second position provides a third usable configuration of the electronic apparatus. Namely, the display panel 12 is fully available and the input panel 14 is also fully available.

In one embodiment, the sensor 30 in the motor-driven embodiment (described with reference to FIGS. 2 to 12) is a sensor to detect a magnetic field generated by the element 28. The sensor 30 may for instance be a magneto-resistive (MR) sensor manufactured by NEC Corporation as described in NEC, Data Sheet, MRMS501A, "*Low voltage operation type Built-in IC ultra-small MR sensor*", No. MR-0501 A-E-02, Date of Issue: April 2008.

In one embodiment, the sensor 30 in the motor-driven embodiment (described with reference to FIGS. 2 to 12) is configured to send a signal to a motor controller (not illustrated in the drawings) which then gives appropriate commands to the motor(s). The motor(s) may be stepper motors running clockwise and anticlockwise. Exemplary motor controllers that may be used for some embodiments of the invention include those described in the following datasheets: (i) STMicroelectronics, L297, "*Stepper Motor Controllers*", December 2001; (ii) SGS-Thomson Microelectronics, L297, L297D, "*Stepper Motor Controllers*", August 1996; and (iii) RS Components, "*Stepper motor driver IC SAA 1027*", Data Pack J, Issued March 1997 232-2699, RS stock number 300-237.

The motors described with reference to FIGS. 2 to 12 (motor-driven embodiment) may have the following characteristics: micro DC servo motors, capable of rotating in both directions, capable of running at low voltage about 2V-4V, and being sufficiently small to fit in the electronic apparatus. Suitable motors are manufactured for instance by MicroMo Electronics, Inc., Clearwater, Fla., United States.

In one embodiment, rather than using a motor-driven mechanism or in addition to using such a mechanism, one or more controllable magnets and/or one or more mechanical elements which position or shape can be controlled may be used to move or to assist in moving the input panel 14 from its first position to its second position and/or from its second position to its first position.

For instance, one or more controllable magnets, such as electromagnets having an appropriate size, may be actuated to cause the input panel 14 to move from its first position to its second position (or to assist in carrying out this movement). One or more controllable magnets may also be actuated to cause the input panel 14 to move from its second position to its first position (or to assist in carrying out this movement). The actuation of the one or more controllable magnets may be performed as soon as the display panel 12 has been moved to its second position (i.e., at a time corresponding to steps (s3)-(s4) or (s9)-(s10) as illustrated in FIGS. 1*a*-1*d*).

Mechanical elements which position or shape can be controlled include elements made of a shape memory alloy. These elements are described for instance in [1] "Shape memory alloy", Apr. 14, 2010, Wikipedia, retrieved on Apr. 16, 2010, from http://en.wikipedia.org/w/index.php?title=Shape_memory_alloy&oldid=356022206 or [2] Richard Lin, "Shape Memory Alloys and Their Applications", retrieved on Apr. 16, 2010 from http://www.stanford.edu/~richlin1/sma/sma.html. Such mechanical elements can be controlled by an electric current or electromagnetic field so that their shape changes so as to exert a force on the input panel 14.

Other actuating means, such as hydraulic or pneumatic units capable of exerting a force and having an appropriate size, may be used for moving or for assisting in moving the input panel 14 from its first position to its second position and/or from its second position to its first position.

One or more sensors, such as proximity sensor(s) or light sensor(s) having an appropriate size, may be used to detect the initial position of the input panel 14 in order to actuate the controllable magnets, or the mechanical elements which position or shape can be controlled (such as elements made of a shape memory alloy), in such a manner that they exert a force on the input panel 14 in the correct direction after the display panel 12 has been moved to its second position. Examples of suitable sensors include: [3] "Subminiature High Sensitivity Photo Interrupter, ITR8307", pages H-33 to H-37 (available from Everlight, Taipei, Taiwan) or [4] "Ultra-Compact Surface-Mount Photointerrupter, TLP848", New Product Guide News, 2006-04 DQ, Toshiba (available from Toshiba, Tokyo, Japan).

The detection of the initial position of the input panel 14 (in order, as mentioned above, to actuate the controllable magnets, or the mechanical elements which position or shape can be controlled, in such a manner that they exert a force on the input panel 14 in the correct direction after the display panel 12 has been moved to its second position) is not limited however to the use of one or more sensors, such as proximity sensor(s) or light sensor(s), as mentioned above. In one embodiment, no dedicated sensors are used for carrying out this detection. Therefore, fewer electronic components are required, battery power and space are spared, and the apparatus is simpler.

In this embodiment, the display panel 12 is a touch panel (also called touch screen) and the same means which are used to detect the position of a finger, hand, stylus or other object on the touch panel are also used to determine whether the input panel 14 occupies its first position or its second position.

If the input panel 14 occupies its first position, the input panel 14 is arranged on top of the display panel 12, and hides a portion of the front face of the display panel 12. For instance, if the touch panel (touch screen) works by reacting to a change in capacitance caused by the presence of a user's finger, hand or other object on (or in the vicinity of) the touch panel, the very presence of the input panel 14 on top of the display panel 12 can be detected thanks to the change in the dielectric properties of the space above the display panel 12 caused by the presence of the input panel 14 in that space.

If, in contrast, the input panel 14 occupies its second position, the input panel 14 is arranged behind the display panel 12 and the input panel 14 does not hide the front face of the display panel 12. If the touch panel (touch screen) works by reacting to a change in capacitance caused by the presence of a user's finger on (or in the vicinity of) the touch panel, the position of the input panel 14 behind the display panel 12 does not change the dielectric properties of the space above the display panel 12. This absence of change in the dielectric properties of the space above the display panel 12 can be interpreted as meaning that the input panel 14 occupies its second position.

The precise effect of the presence of the input panel 14 in its first position on the output of the touch sensing capabilities of the display panel 12 may be recognized by appropriate tests and calibrations, so that the position of the input panel 14 is properly discriminated in operation.

In one embodiment, the display panel 12 is mechanically coupled to the input panel 14, in such a manner that, when the display panel 12 is moved to its second position, the position of the input panel 14 is first modified to an intermediate position between the first position and the second position of the input panel 14. When the input panel 14 has reached the intermediate position, the controllable magnets (or similar actuating means, as described above) may be actuated in a particular direction depending on the initial position of the input panel 14 before the movement of the display panel 12, as detected by the one or more sensors (as described above), the result of the detection being stored in memory. The actuation of the controllable magnets (or similar actuating means, as described above) in the particular direction may cause a relatively small movement of the input panel 14 which is sufficient so that, when the display panel 12 is moved back towards its first position, the display panel 12 pushes the input panel 14 either in its first position or in its second position. In this embodiment, the force to be exerted by the controllable magnets (or similar actuating means, as described above) can be relatively small, thus reducing the consumed energy.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Electronic apparatus including
a body;
a display panel movably connected to the body so as to be able to occupy at least a first position and a second position with respect to the body; and
an input panel movably connected to the body so as to be able to occupy at least a first position and a second position with respect to the body;
the apparatus being configured so that,
when the display panel occupies its first position and the input panel occupies its first position, the input panel hides part of the display panel;
when the display panel occupies its first position and the input panel occupies its second position, the display panel hides at least part of the input panel; and
when the display panel occupies its second position, the input panel is at least one of movable from its first position to its second position, and movable from its second position to its first position; and
including one or more controllable magnets to move or to assist in moving the input panel at least one of:
from its first position to its second position, and
from its second position to its first position.

2. Apparatus of claim 1, wherein the display panel is mechanically coupled to the input panel, in such a manner that, when the display panel is moved to its second position, the position of the input panel is first caused to be modified to an intermediate position between the first position and the second position of the input panel.

3. Electronic apparatus including
a body;
a display panel movably connected to the body so as to be able to occupy at least a first position and a second position with respect to the body; and
an input panel movably connected to the body so as to be able to occupy at least a first position and a second position with respect to the body;
the apparatus being configured so that,
when the display panel occupies its first position and the input panel occupies its first position, the input panel hides part of the display panel;
when the display panel occupies its first position and the input panel occupies its second position, the display panel hides at least part of the input panel; and
when the display panel occupies its second position, the input panel is at least one of movable from its first position to its second position, and movable from its second position to its first position; and
including one or more controllable shape memory alloy elements to move or to assist in moving the input panel at least one of:
from its first position to its second position, and
from its second position to its first position.

4. Apparatus of claim 3, wherein the display panel is mechanically coupled to the input panel, in such a manner that, when the display panel is moved to its second position, the position of the input panel is first caused to be modified to an intermediate position between the first position and the second position of the input panel.

5. Electronic apparatus including
a body;
a display panel movably connected to the body so as to be able to occupy at least a first position and a second position with respect to the body; and
an input panel movably connected to the body so as to be able to occupy at least a first position and a second position with respect to the body;
the apparatus being configured so that,
when the display panel occupies its first position and the input panel occupies its first position, the input panel hides part of the display panel;
when the display panel occupies its first position and the input panel occupies its second position, the display panel hides at least part of the input panel; and
when the display panel occupies its second position, the input panel is at least one of movable from its first position to its second position, and movable from its second position to its first position; and including
one or more sensors configured to detect whether the input panel occupies its first position or its second position;
the apparatus being further configured so that,
when the display panel is moved from its first position to its second position while the input panel is determined using the one or more sensors to occupy its second position, the input panel is caused to move to its first position, and
when the display panel is moved from its first position to its second position while the input panel is determined using the one or more sensors to occupy its first position, the input panel is caused to move to its second position.

6. Electronic apparatus including
a body;
a display panel movably connected to the body so as to be able to occupy at least a first position and a second position with respect to the body; and
an input panel movably connected to the body so as to be able to occupy at least a first position and a second position with respect to the body;
the apparatus being configured so that,
when the display panel occupies its first position and the input panel occupies its first position, the input panel hides part of the display panel;
when the display panel occupies its first position and the input panel occupies its second position, the display panel hides at least part of the input panel; and
when the display panel occupies its second position, the input panel is at least one of movable from its first position to its second position, and movable from its second position to its first position; and wherein
the display panel includes touch sensing capabilities to detect the presence of a finger, hand or other object on the display panel or in the vicinity thereof;
the apparatus being further configured so that
when the display panel is moved from its first position to its second position while the input panel is determined to occupy its second position, the input panel is caused to move to its first position, and when the display panel is moved from its first position to its second position while the input panel is determined to occupy its first position, the input panel is caused to move to its second position; wherein the same touch sensing capabilities which are used to detect the presence or position of a finger, hand or other object on the display panel or in the vicinity thereof are also used to determine whether the input panel occupies its first position or its second position.

\* \* \* \* \*